US006693806B2

(12) United States Patent
Uchida

(10) Patent No.: US 6,693,806 B2
(45) Date of Patent: Feb. 17, 2004

(54) ELECTRIC POWER SOURCE

(75) Inventor: Takeshi Uchida, Saitama (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/256,071

(22) Filed: Sep. 27, 2002

(65) Prior Publication Data

US 2003/0058668 A1 Mar. 27, 2003

(30) Foreign Application Priority Data

Sep. 27, 2001 (JP) ........................................ 2001-296436

(51) Int. Cl.$^7$ ............................... H02H 7/10; H02J 3/00
(52) U.S. Cl. ........................... 363/50; 307/64; 307/86
(58) Field of Search ....................... 307/64, 66, 85, 307/86; 363/50, 52, 59

(56) References Cited

U.S. PATENT DOCUMENTS

| | | | | |
|---|---|---|---|---|
| 3,909,685 A | * | 9/1975 | Baker et al. ................. | 318/139 |
| 5,396,165 A | * | 3/1995 | Hwang et al. ............... | 323/210 |
| 5,579,197 A | * | 11/1996 | Mengelt et al. ............. | 361/93.4 |
| 5,703,412 A | * | 12/1997 | Takemoto et al. ......... | 307/10.1 |
| 5,834,858 A | * | 11/1998 | Crosman et al. ............... | 307/66 |
| 5,905,360 A | * | 5/1999 | Ukita ........................ | 320/118 |
| 5,977,651 A | * | 11/1999 | Ueda et al. ................ | 307/10.1 |
| 5,982,138 A | * | 11/1999 | Krieger ....................... | 320/105 |
| 6,556,462 B1 | * | 4/2003 | Steigerwald et al. .......... | 363/89 |

* cited by examiner

Primary Examiner—Adolf Berhane
(74) Attorney, Agent, or Firm—Birch, Stewart, Kolasch & Birch, LLP

(57) ABSTRACT

In an electric power source for supplying an electric power from a battery to an electric power line with boosting a voltage generated by the battery so that the electric power of boosted voltage is supplied to the electric power line, a main switch device prevents the electric power supply into the electric power line from the electric power source and the electric power supply from the electric power line into the electric power source in a case in which the boosted voltage to be supplied to the electric power line is less than a target voltage not less than a voltage of the electric power line, while allowing the electric power supply into the electric power line from the electric power source when the boosted voltage to be supplied to the electric power line is not less than the target voltage.

20 Claims, 5 Drawing Sheets

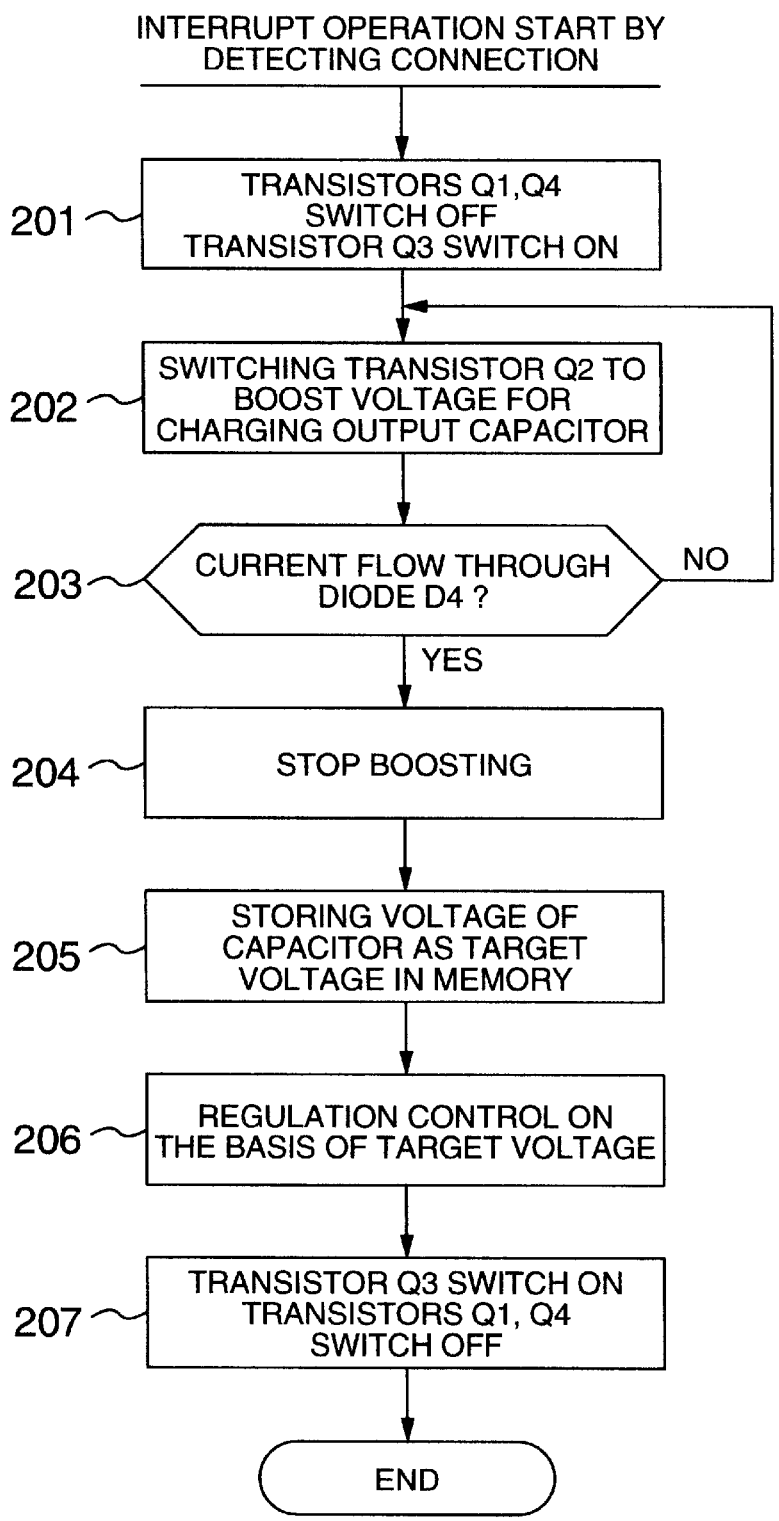

ELECTRIC POWER SOURCE

This nonprovisional application claims priority under 35 U.S.C. §119(a) on Patent Application No. 2001-296436 filed in JAPAN on Sep. 27, 2001, which is herein incorporated by reference.

BACKGROUND OF THE INVENTION AND RELATED ART STATEMENT

The present invention relates to an electric power source for supplying an electric power from a battery to an electric power line extending at an outside of the electric power source with boosting a voltage generated by the battery so that the electric power of boosted voltage is supplied to the electric power line.

It is well known that an electric power source for supplying an electric power from a battery to an electric power line extending at an outside of the electric power source with boosting a voltage generated by the battery so that the electric power of boosted voltage is supplied to the electric power line, is electrically connected to the electric power line when the electric power line is active, that is, a voltage of the electric power line is kept at a desirable normal value.

OBJECT AND SUMMARY OF THE INVENTION

An object of the present invention is to provide an electric power source for supplying an electric power from a battery to an electric power line extending at an outside of the electric power source with boosting a voltage generated by the battery so that the electric power of boosted voltage is supplied to the electric power line, by which electric power source an excessive amount of the electric power supply from the electric power line into the electric power source is restrained even when the electric power source is electrically connected to the active electric power line.

According to the present invention, an electric power source for supplying an electric power from a battery to an electric power line extending at an outside of the electric power source with boosting a voltage generated by the battery so that the electric power of boosted voltage is supplied to the electric power line, comprises, a main switch device operable to switch on and off the electric power supply from the electric power source to the outside of the electric power source, and a voltage booster operable to boost the voltage generated by the battery to generate the electric power of boosted voltage, wherein the main switch device prevents the electric power supply into the electric power line from the electric power source and the electric power supply from the electric power line into the electric power source in a case in which the boosted voltage to be supplied to the electric power line is less than a target voltage not less than a voltage of the electric power line, while allowing the electric power supply into the electric power line from the electric power source when the boosted voltage to be supplied to the electric power line is not less than the target voltage.

Since the main switch device prevents the electric power supply into the electric power line from the electric power source and the electric power supply from the electric power line into the electric power source in a case in which the boosted voltage to be supplied to the electric power line is less than a target voltage not less than a voltage of the electric power line, while allowing the electric power supply into the electric power line from the electric power source and preventing the electric power supply from the electric power line into the electric power source when the boosted voltage to be supplied to the electric power line is not less than the target voltage, an excessive amount of the electric power supply from the electric power line into the electric power source is restrained even when the electric power source is electrically connected to the electric power line being active.

If the electric power source further comprises a detector operable to detect whether or not an electric communication is formed between the electric power source and the electric power line so that the electric power of boosted voltage is allowed to be supplied from the electric power source to the electric power line, and the voltage booster is allowed to boost the voltage generated by the battery to generate the electric power of boosted voltage when the electric communication is formed between the electric power source and the electric power line and is prevented from boosting the voltage generated by the battery to generate the electric power of boosted voltage when the electric communication is not formed between the electric power source and the electric power line, so that the voltage booster starts to boost the voltage after the electric communication is formed between the electric power source and the electric power line, an electric power charged in the battery and/or the voltage booster can be maintained effectively. The voltage booster may include a capacitor for storing the electric power of boosted voltage to be supplied into the electric power line. If the main switch device prevents the electric power supply from the electric power source to the outside of the electric power source (for example, a human body or an electrically grounded member at the outside of the electric power source) and the electric power supply from the electric power line into the electric power source in at least one of a case in which the electric communication is not formed between the electric power source and the electric power line and the case in which the boosted voltage to be supplied to the electric power line is less than the target voltage, while allowing the electric power supply into the electric power line from the electric power source and preventing the electric power supply from the electric power line into the electric power source when the electric communication is formed between the electric power source and the electric power line and the boosted voltage to be supplied to the electric power line is not less than the target voltage, the electric power charged in the battery and/or the voltage booster can be maintained effectively and the excessive amount of the electric power supply from the electric power line into the electric power source is restrained even when the electric power source is electrically connected to the electric power line being active.

It is preferable that the target voltage is more than the voltage of the electric power line. The electric power source may further comprise a supplemental switch device operable to switch on and off the electric power supply from the electric power line into the electric power source, and a voltage step-down circuit operable to decrease a voltage of the electric power supply from the electric power line into the electric power source to be electrically charged into the battery, and the voltage step-down circuit decreases a voltage of the electric power supply from the electric power line into the electric power source when the supplemental switch device allows the electric power supply from the electric power line into the electric power source and the voltage booster is prevented from boosting the voltage.

If the main switch device includes a diode operable to prevent the electric power supply from the electric power line into the electric power source and allow the electric power supply into the electric power line from the electric power source, it is preferable for easily keeping the boosted voltage at a suitable degree that boosting the voltage by the voltage booster is stopped in response to detecting that the diode allows the electric power supply into the electric power line from the electric power source. It is preferable for easily setting the target voltage at a suitable degree that the boosted voltage is equal to the target voltage when the diode allows the electric power supply into the electric power line from the electric power source, when the boosted voltage is kept within a range including the target voltage suitable for the voltage of the electric power source.

The detector may detect a mechanical connection for the electric communication between the electric power source and the electric power line and/or a manual operation of a connector switch operated by an operator when the electric power source is electrically connected to the electric power line.

It is preferable for easily controlling the voltage booster to keep the boosted voltage at the suitable degree that the voltage booster increases a value of the boosted voltage in response to that the boosted voltage is less than the target voltage, and/or in response to detecting that the diode prevents the electric power supply into the electric power line from the electric power source.

It is preferable for keeping the boosted voltage at the suitable degree that the voltage booster boosts the voltage generated by the battery to generate the electric power of boosted voltage when the main switch device allows the electric power supply into the electric power line from the electric power source. It is preferable for restraining an excessive increase of the boosted voltage that the voltage booster is prevented from increasing the value of the boosted voltage in response to detecting that the diode allows the electric power supply into the electric power line from the electric power source. It is preferable that the voltage booster is prevented from increasing the value of the boosted voltage when the boosted voltage is more than the target voltage.

It is preferable for maintaining the electric power charged in the battery and/or the voltage booster effectively that the voltage booster is prevented from increasing the value of the boosted voltage when the electric communication is not formed between the electric power source and the electric power line.

It is preferable for easily setting the target voltage suitable for the electric power line that the target voltage is set at a voltage value of the boosted voltage at which the boosted voltage enables the diode to allow the electric power supply into the electric power line from the voltage booster. If boosting the voltage by the voltage booster is controlled in such a manner that the boosted voltage is kept within a voltage range including the target voltage, the boosted voltage is kept within the voltage range suitable for the electric power line, preferably more than the voltage of the electric power line.

BRIEF DESCRIPTION OF THE DRAWINGS

FIG. 5 is a flow chart for controlling the another electric power source in response to a connection of the electric power source to the electric power line.

DETAILED DESCRIPTION OF PREFERRED EMBODIMENTS

Figure 1:
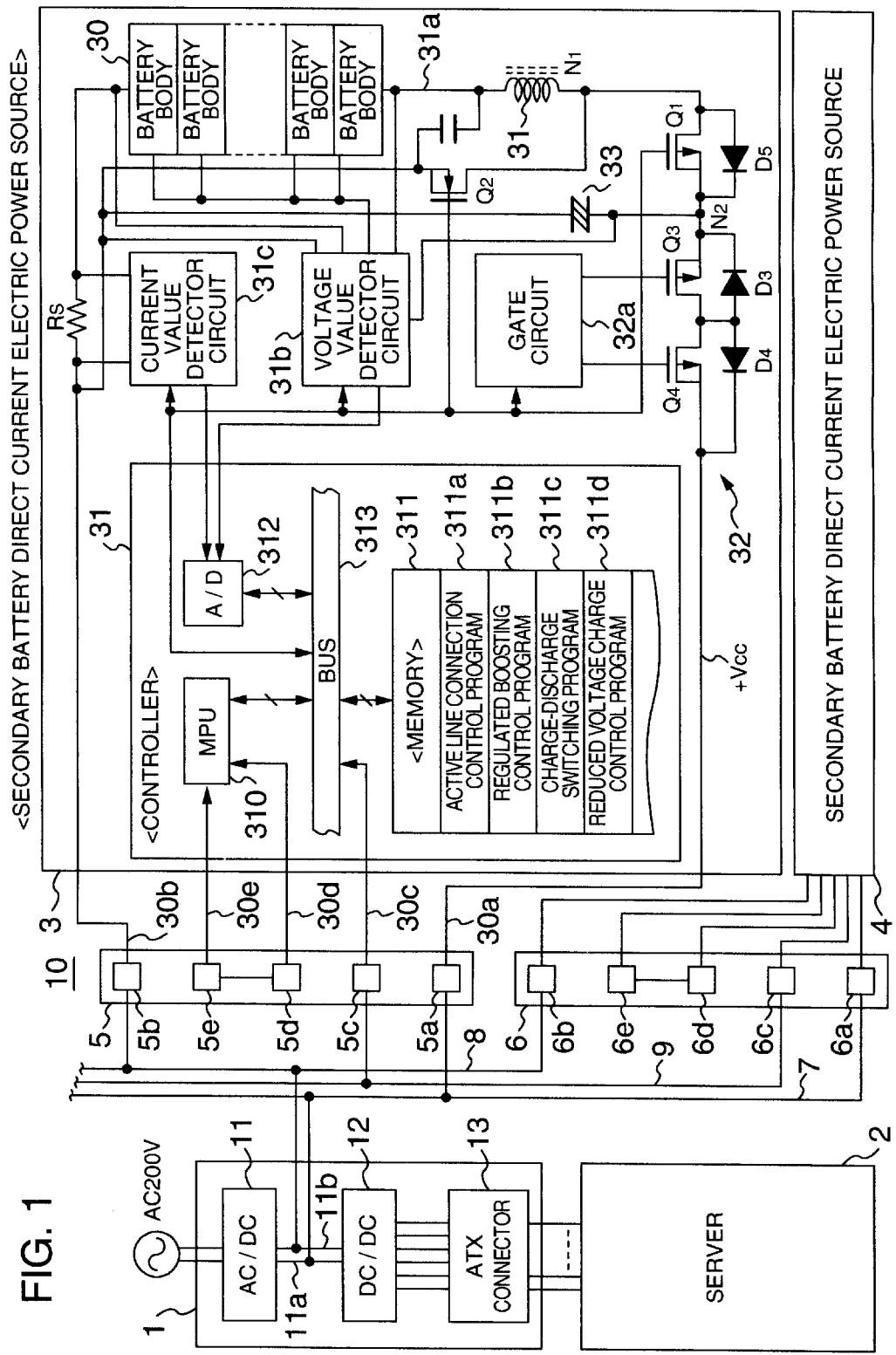
FIG. 1 is a schematic view showing an electric power source of the invention connected to an electric power line extending at an outside of the electric power source.

A backup system 10 for an electric power line 11a, 11b for a server computer 2 is electrically connected to the electric power line 11a, 11b in an electric power source block 1 containing therein an AC/DC converter 11, a DC/DC converter 12 and a so-called ATX connector 13, and includes a plurality of electric power sources 3 and 4 electrically connected in parallel with each other to the electric power line 11a, 11b through respective connectors 5 and 6 and a pair of a common electric power source line 7 and a common electric ground line 8. A cooperation between the electric power sources 3 and 4 is controlled through a control line 9. The AC/DC converter 11 converts an AC electric power of 200V to a DC electric power of 48V, and the DC/DC converter 12 generates a DC electric power of 12V, a DC electric power of 5V, a DC electric power of 3V, a DC electric power of −12V and a DC electric power of −5V to be supplied to the server computer 2 through the ATX connector 13. The backup system 10 can supply the DC electric power of 48V to the DC/DC converter 12 as a backup electric power source for the AC electric power of 200V.

Since the connectors 5 and 6 have the same structure and the electric power sources 3 and 4 have the same structure, only the structure of the connector 5 and the structure and operation of the electric power source 3 are described below. An output +Vcc line 30a of the electric power source 3 is electrically connected to the common electric power source line 7 through a connector terminal 5a, an electrically grounded line 30b of the electric power source 3 is electrically connected to the common electric ground line 8 through a connector terminal 5b, an operation control line 30c of the electric power source 3 is electrically connected to the control line 9 through a connector terminal 5c, and connection detecting lines 30d and 30e are electrically connected to each other in the connector 5 through connector terminals 5d and 5e when the electric power source 3 is connected to the connector 5 so that it is detected that an electric communication is formed between the electric power source 3 and the electric power lines 11a, 11b.

The electric power source 3 can contain battery bodies 30 electrically connected in series, an output voltage of which battery bodies 30 is boosted by a flyback pulse or counter electromotive force generated in a coil 32 when switching on and off frequently a transistor Q2. An electric power of the boosted voltage is stored in a capacitor 33 through a diode D5. A controller 31 controls the switching of the transistor Q2 on the basis of a voltage across the capacitor 33 measured by a voltage value detector circuit 31b in such a manner that the voltage across the capacitor 33 is kept substantially at DC 48V, that is, a regulated voltage boosting control program 311b is carried out.

A main switch device including a transistor Q3 and a diode D4 for preventing an electric power supply into the electric power line 11a from the electric power source 3 and an electric power supply from the electric power line 11a into the electric power source 3 when the boosted voltage, that is, the voltage across the capacitor 33 is less than a target voltage not less than a voltage of the electric power line DC 48V and for allowing the electric power supply into the electric power line 11a from the electric power source 3 when the boosted voltage, that is, the voltage across the capacitor 33 is not less than the target voltage, and a supplemental switch device including a transistor Q4 and a diode D3 preventing an electric power supply from the electric power line 11a into the electric power source 3 and an electric power supply into the electric power line 11a from the electric power source 3 when the boosted voltage, that is, the voltage across the capacitor 33 is more than the voltage of the electric power line DC 48V and for allowing the electric power supply from the electric power line 11a into the electric power source 3 when the boosted voltage, that is, the voltage across the capacitor 33 is less than the target voltage are electrically connected to the capacitor 33 and the electric power line 11a in series, and controlled by the controller 31 through a gate circuit 32a. The main switch device and the supplemental switch device form a charge-discharge switching device 32 controlled along a charge-discharge switching program 311c. The transistor Q3 is switched off and the transistor Q4 is switched on when the electric power is charged into the battery bodies 30 from the electric power line 11a, and the transistor Q3 is switched on and the transistor Q4 is switched off when the electric power is discharged from the capacitor 33 into the electric power line 11a. The switching between the battery charge operation and the capacitor discharge operation is determined by the controller 31 on the basis of an electric current flow direction through an electric resistance Rs measured by a current value detector circuit 31c.

Figure 2:
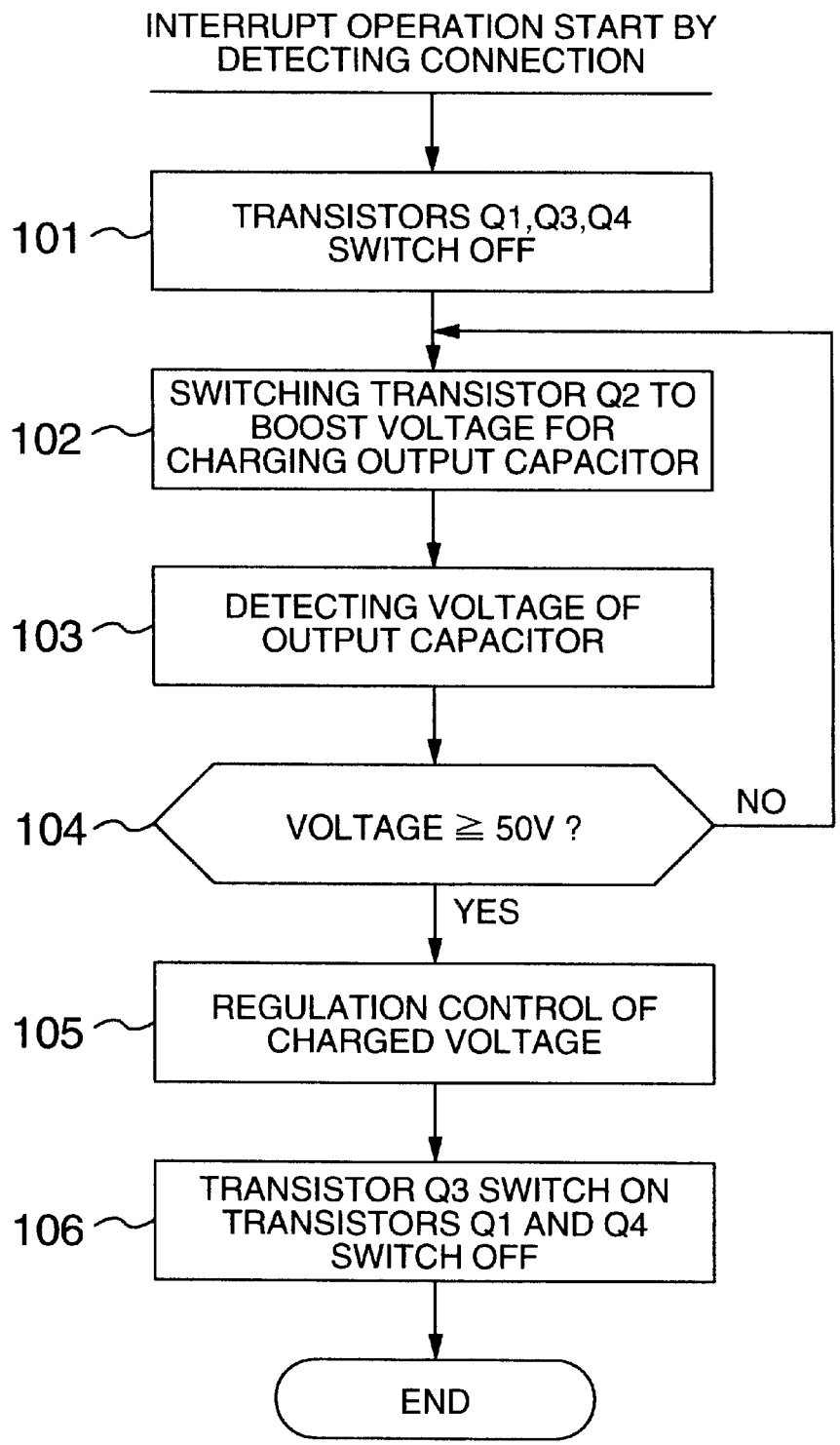
FIG. 2 is a flow chart for controlling the electric power source in response to a connection of the electric power source to the electric power line.

In response to the detection of that electric communication is formed between the electric power source 3 and the active electric power lines 11a, 11b, an active line connection control program 311a for preparing the electric discharge from the capacitor 33 is carried out, as shown in FIG. 2. At first, the transistors Q1, Q3 and Q4 are switched off as step 101. Before the electric communication is formed between the electric power source 3 and the active electric power lines 11a, 11b, the transistors Q1, Q3 and Q4 may be switched off as step 101. Before one of the electric power sources 3 and 4 is electrically connected to the active electric power lines 11a, 11b, another one of the electric power sources 3 and 4 is operated to enable the another one of the electric power sources 3 and 4 to supply the electric power into the active electric power lines 11a, 11b. Subsequently, the transistor Q2 is switched on and off at a predetermined frequency to generate the flyback pulse or counter electromotive force in the coil 32 to electrically charge the capacitor 33 through the diode D5, that is, to increase the boosted voltage, that is, the voltage across the capacitor 33 as step 102 until the voltage across the capacitor 33 measured by the voltage value detector circuit 31b becomes not less than the target voltage of DC 50V. If the voltage across the capacitor 33 measured by the voltage value detector circuit 31b at step 103 is not less than the target voltage of DC 50V at step 104, the regulated boosting control program 311b is carried out at step 105 to keep the voltage across the capacitor 33 within a predetermined small range not less than DC 48V, for example, within a predetermined small range including DC 50V. At this situation, since the voltage across the capacitor 33 is not less than DC 50V, the boosting operation by switching the transistor Q2 is not carried out. In response to that the voltage across the capacitor 33 becomes less than DC 48V, the boosting operation by switching the transistor Q2 is restarted along the regulated boosting control program 311b. If the voltage across the capacitor 33 measured by the voltage value detector circuit 31b at step 103 is less than the target voltage of DC 50V at step 104, the boosting operation by switching the transistor Q2 is continued to increase the boosted voltage, that is, the voltage across the capacitor 33.

If the regulated boosting control program 311b is carried out at step 105 to keep the voltage across the capacitor 33 within the predetermined small range not less than DC 48V, the transistor Q3 is switched on and the transistors Q1 and Q4 are switched off to discharge the electric power of boosted voltage from the capacitor into the electric power line 11a as step 106. If the voltage across the capacitor 33 becomes less than DC 48V, the boosting operation by switching the transistor Q2 is restarted along the regulated boosting control program 311b to increase the boosted voltage, and the boosting operation is stopped when the voltage across the capacitor 33 becomes more than the predetermined small range.

When the electric power is charged into the battery bodies 30 along a reduced voltage charge control program 311d, the transistor Q3 is-switched off, the transistor Q4 is switched on and a gate voltage of the transistor Q1 is adjusted to change an impedance thereof so that the battery bodies 30 are electrically charged reliably.

Figure 3:
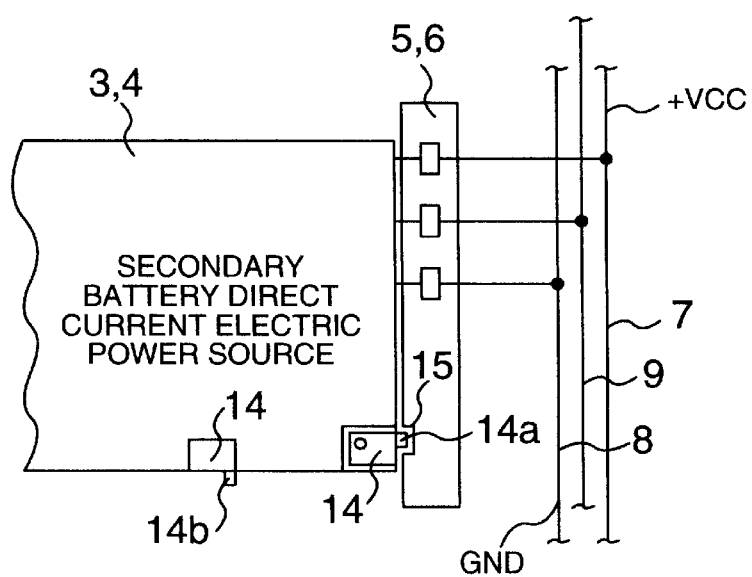
FIG. 3 is a schematic view showing a detector for detecting whether or not an electric communication is formed between the electric power source and the electric power line.

As shown in FIG. 3, a limit switch 14 operated when the electric power source 3 or 4 is attached to, that is, mechanically connected to the connector 5 or 6 to form the electric communication between the electric power source 3 and the active electric power lines 11a, 11b so that a movable button 14a of the limit switch 14 is pressed by a recess 15 of the connector 5 or 6 may detect that the electric communication is formed between the electric power source 3 and the active electric power lines 11a, 11b. The limit switch 14 operated when the electric power source 3 or 4 is attached to, that is, mechanically connected to the connector 5 or 6 to form the electric communication between the electric power source 3 and the active electric power lines 11a, 11b and a movable button 14b of the limit switch 14 is pressed by an operator person may detect that the electric communication is formed between the electric power source 3 and the active electric power lines 11a, 11b.

The controller 31 includes a MPU 310 for processing the information obtained from the operation control line 30c, voltage value detector circuit 31b, current value detector circuit 31c, and the connection detecting lines 30d and 30e and outputting instruction signals to the voltage value detector circuit 31b, current value detector circuit 31c, gate circuit 32a, and transistor Q2, a memory 311 storing therein the programs 311a–d, an A/D converter 312 through which signals from the voltage value detector circuit 31b and current value detector circuit 31c is input to the MPU 310, and an interface bus 313 through which the information, instruction signals and the programs 311a–d are taken out of and into the MPU 310.

Figure 4:
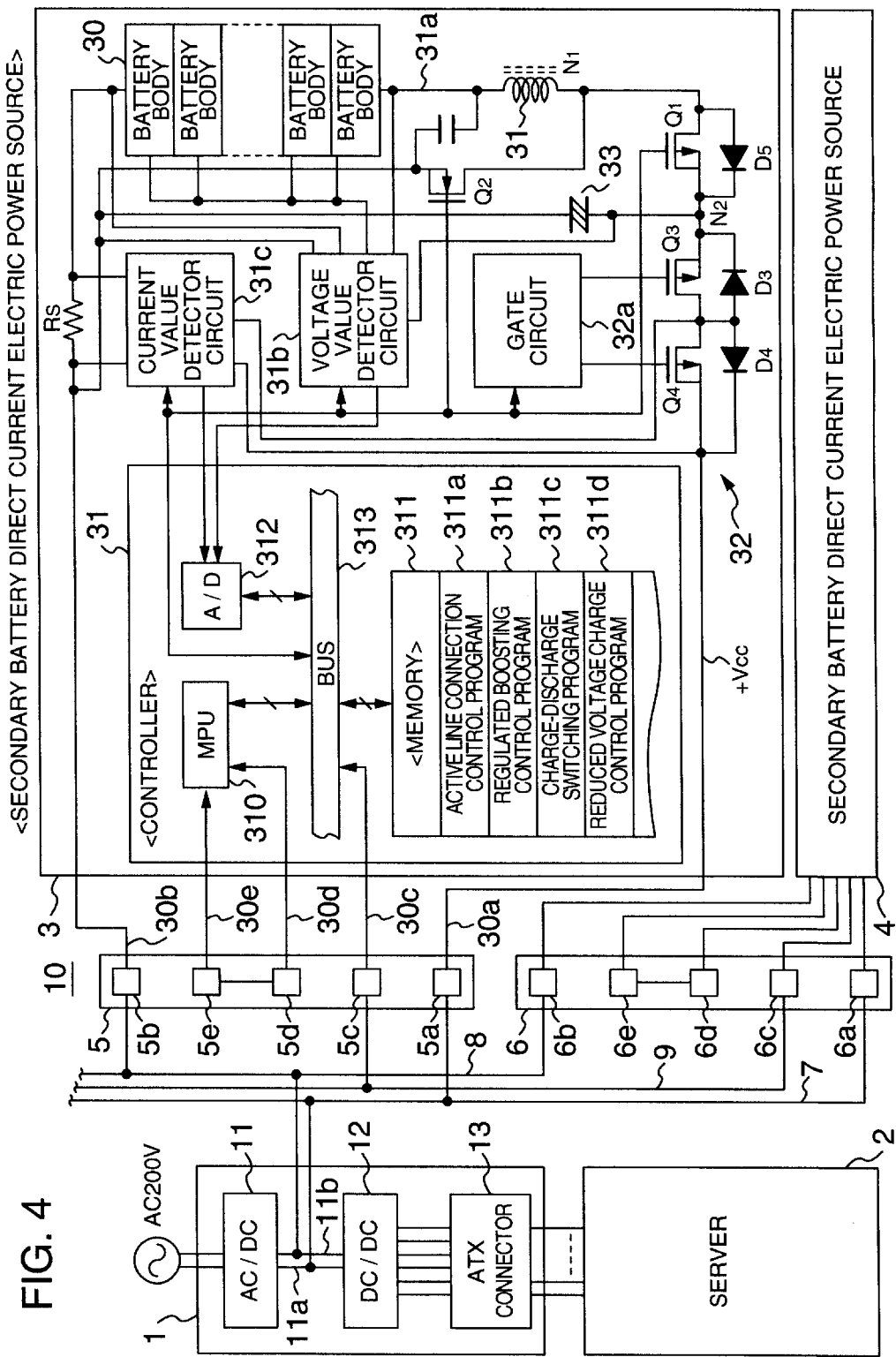
FIG. 4 is a schematic view showing another electric power source of the invention connected to the electric power line extending at an outside of the electric power source.

In another embodiment of the electric power source 3 as shown in FIG. 4, the target voltage is not fixed, but is changeable in accordance with the voltage value between the electric power lines 11a, 11b, that is, the target voltage is a voltage value across the capacitor 33 at which the electric power is supplied through the diode D4 from the capacitor 33 to the electric power lines 11a, 11b. Therefore, in this embodiment, the transistor Q3 is switched on to enable the electric power to be supplied through the diode D4 from the capacitor 33 to the electric power lines 11a, 11b even when the boosting operation by switching on and off frequently the transistor Q2 is carried out to increase the boosted voltage, that is, the voltage across the capacitor 33. Whether or not the electric power is supplied through the diode D4 from the capacitor 33 to the electric power lines 11a, 11b is detected by the current value detector circuit measuring a voltage across the diode D4.

In response to the detection of that electric communication is formed between the electric power source 3 and the active electric power lines 11a, 11b, the active line connection control program 311a for preparing the electric discharge from the capacitor 33 is carried out, as shown in FIG. 5. At first, the transistors Q1, and Q4 are switched off and the transistor Q3 is switched on as step 201. Before the electric communication is formed between the electric power source 3 and the active electric power lines 11a, 11b, the transistors Q1, Q3 and Q4 may be switched off. Before one of the electric power sources 3 and 4 is electrically connected to the active electric power lines 11a, 11b, another one of the electric power sources 3 and 4 is operated to enable the another one of the electric power sources 3 and 4 to supply the electric power into the active electric power lines 11a, 11b. Subsequently, the transistor Q2 is switched on and off at a predetermined frequency to generate the flyback pulse or counter electromotive force in the coil 32 to electrically charge the capacitor 33 through the diode D5, that is, to increase the boosted voltage, that is, the voltage across the capacitor 33 as step 202 until an increase of the boosted voltage enables the diode D4 to allow the electric power supply into the electric power line 30a from the capacitor 33. If it is detected at step 203 that the increase of the boosted voltage enables the diode D4 to allow the electric power supply into the electric power line 30a from the capacitor 33, the frequent switching on and off of the transistor Q2, that is, the voltage boosting is stopped at step 204, the voltage across the capacitor 33 measured when the switching on and off of the transistor Q2 is stopped is recorded as the target voltage at step 205, and the regulated boosting control program 311b is carried out at step 206 to keep the voltage across the capacitor 33 within a small range including the target voltage. At this situation, since the voltage across the capacitor 33 is not less than the target voltage, the boosting operation by switching the transistor Q2 is not carried out. In response to that the voltage across the capacitor 33 becomes less than the small range, the boosting operation by switching the transistor Q2 is restarted along the regulated boosting control program 311b, and the boosting operation is stopped when the voltage across the capacitor 33 becomes more than the small range. If the increase of the boosted voltage does not enable the diode D4 to allow the electric power supply into the electric power line 30a from the capacitor 33 at step 203, the boosting operation by switching the transistor Q2 is continued to increase the boosted voltage, that is, the voltage across the capacitor 33.

If the regulated boosting control program 311b is carried out at step 206 to keep the voltage across the capacitor 33 within the small range, the transistor Q3 is switched on and the transistors Q1 and Q4 are switched off to discharge the electric-power of boosted voltage from the capacitor into the electric power line 11a as step 207. If the boosted voltage does not enable the diode D4 to allow the electric power supply into the electric power line 30a from the capacitor 33, the boosting operation by switching the transistor Q2 is restarted along the regulated boosting control program 311b to increase the boosted voltage.

The switching on and off of the transistor Q2 for boosting or increasing the voltage across the capacitor 33 may be controlled, without measuring and/or recording the boosted voltage and/or the regulated boosting control program 311b for keeping the voltage across the capacitor 33 within the small range, only according to whether or not the electric power is supplied through the diode D4 from the capacitor 33 to the electric power lines 11a, 11b, that is, the transistor Q2 is switched on and off frequently to increase the voltage across the capacitor 33 when the diode D4 prevents the electric power supply from the capacitor 33 to the electric power lines 11a, 11b, and the transistor Q2 is prevented from being switched on and off frequently to increase the voltage across the capacitor 33 when the diode D4 allows the electric power from the capacitor 33 to the electric power lines 11a, 11b.

If the battery bodies 30 do not need to be electrically charged by the electric power source 3 because the battery bodies 30 are electrically charged at the outside of the electric power source 3, the supplemental switch device including the transistor Q4 and the diode D3, and the transistor Q1 may be eliminated from the electric power source 3.

What is claimed is:

1. An electric power source for supplying an electric power from a battery to an electric power line extending at an outside of the electric power source with boosting a voltage generated by the battery so that the electric power of boosted voltage is supplied to the electric power line, comprising, a main switch device operable to switch on and off the electric power supply from the electric power source to the outside of the electric power source, and a voltage booster operable to boost the voltage generated by the battery to generate the electric power of boosted voltage, wherein the main switch device prevents the electric power supply into the electric power line from the electric power source and the electric power supply from the electric power line into the electric power source in a case in which the boosted voltage to be supplied to the electric power line is less than a target voltage not less than a voltage of the electric power line, while allowing the electric power supply into the electric power line from the electric power source when the boosted voltage to be supplied to the electric power line is not less than the target voltage.

2. An electric power source according to claim 1, further comprising a detector operable to detect whether or not an electric communication is formed between the electric power source and the electric power line so that the electric power of boosted voltage is allowed to be supplied from the electric power source to the electric power line, wherein the voltage booster is allowed to boost the voltage generated by the battery to generate the electric power of boosted voltage when the electric communication is formed between the electric power source and the electric power line.

3. An electric power source according to claim 1, wherein the voltage booster includes a capacitor for storing the electric power of boosted voltage to be supplied into the electric power line.

4. An electric power source according to claim 1, further comprising a detector operable to detect whether or not an electric communication is formed between the electric power source and the electric power line so that the electric power of boosted voltage is allowed to be supplied from the electric power source to the electric power line, wherein the main switch device prevents the electric power supply from the electric power source to the outside of the electric power source and the electric power supply from the electric power line into the electric power source in at least one of a case in which the electric communication is not formed between the electric power source and the electric power line and the case in which the boosted voltage to be supplied to the electric power line is less than the target voltage, while allowing the electric power supply into the electric power line from the electric power source when the electric communication is formed between the electric power source and the electric power line and the boosted voltage to be supplied to the electric power line is not less than the target voltage.

5. An electric power source according to claim 1, wherein the target voltage is more than the voltage of the electric power line.

6. An electric power source according to claim 1, further comprising a supplemental switch device operable to switch on and off the electric power supply from the electric power line into the electric power source, and a voltage step-down circuit operable to decrease a voltage of the electric power supply from the electric power line into the electric power source to be electrically charged into the battery, wherein the voltage step-down circuit decreases a voltage of the electric power supply from the electric power line into the electric power source when the supplemental switch device allows the electric power supply from the electric power line into the electric power source and the voltage booster is prevented from boosting the voltage.

7. An electric power source according to claim 1, wherein the main switch device includes a diode operable to prevent the electric power supply from the electric power line into the electric power source and allow the electric power supply into the electric power line from the electric power source, and boosting the voltage by the voltage booster is stopped in response to detecting that the diode allows the electric power supply into the electric power line from the electric power source.

8. An electric power source according to claim 7, wherein the boosted voltage is equal to the target voltage when the diode allows the electric power supply into the electric power line from the electric power source.

9. An electric power source according to claim 2, wherein the detector is operable to detect a mechanical connection for the electric communication between the electric power source and the electric power line.

10. An electric power source according to claim 2, wherein the detector is operable to detect a manual operation of a connector switch operated by an operator when the electric power source is electrically connected to the electric power line.

11. An electric power source according to claim 4, wherein the detector is operable to detect a mechanical connection for the electric communication between the electric power source and the electric power line.

12. An electric power source according to claim 4, wherein the detector is operable to detect a manual operation of a connector switch operated by an operator when the electric power source is electrically connected to the electric power line.

13. An electric power source according to claim 1, wherein the voltage booster is operable to increase a value of the boosted voltage in response to detecting that the boosted voltage is less than the target voltage.

14. An electric power source according to claim 1, wherein the main switch device includes a diode operable to prevent the electric power supply from the electric power line into the electric power source and allow the electric power supply into the electric power line from the electric power source, and the voltage booster is operable to increase a value of the boosted voltage in response to detecting that the diode is prevented from allowing the electric power supply into the electric power line from the electric power source.

15. An electric power source according to claim 1, wherein the voltage booster is allowed to boost the voltage generated by the battery to generate the electric power of boosted voltage when the main switch device allows the electric power supply into the electric power line from the electric power source.

16. An electric power source according to claim 1, wherein the main switch device includes a diode operable to prevent the electric power supply from the electric power line into the electric power source and allow the electric power supply into the electric power line from the electric power source, and the voltage booster is prevented from increasing a value of the boosted voltage in response to detecting that the diode allows the electric power supply into the electric power line from the electric power source.

17. An electric power source according to claim 1, wherein the voltage booster is prevented from increasing a value of the boosted voltage when the boosted voltage is more than the target voltage.

18. An electric power source according to claim 1, further comprising a detector operable to detect whether or not an electric communication is formed between the electric power source and the electric power line so that the electric power of boosted voltage is allowed to be supplied from the electric power source to the electric power line, wherein the voltage booster is prevented from increasing a value of the boosted voltage when the electric communication is not formed between the electric power source and the electric power line.

19. An electric power source according to claim 1, wherein the main switch device includes a diode operable to prevent the electric power supply from the electric power line into the electric power source and allow the electric power supply into the electric power line from the electric power source, and the target voltage is set at a voltage value of the boosted voltage at which the boosted voltage enables the diode to allow the electric power supply into the electric power line from the voltage booster.

20. An electric power source according to claim 19, wherein boosting the voltage by the voltage booster is controlled in such a manner that the boosted voltage is kept within a voltage range including the target voltage.

* * * * *